United States Patent
Tokura et al.

(10) Patent No.: US 9,036,995 B2
(45) Date of Patent: May 19, 2015

(54) OPTICAL COMMUNICATION SYSTEM

(75) Inventors: Toshiyuki Tokura, Tokyo (JP); Kazuyuki Ishida, Tokyo (JP); Takashi Mizuochi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 141 days.

(21) Appl. No.: 13/814,513

(22) PCT Filed: Sep. 3, 2010

(86) PCT No.: PCT/JP2010/065128
§ 371 (c)(1),
(2), (4) Date: Feb. 6, 2013

(87) PCT Pub. No.: WO2012/029169
PCT Pub. Date: Mar. 8, 2012

(65) Prior Publication Data
US 2013/0129356 A1    May 23, 2013

(51) Int. Cl.
*H04J 14/02* (2006.01)
*H04B 10/077* (2013.01)
(Continued)

(52) U.S. Cl.
CPC ............. *H04J 14/02* (2013.01); *H04B 10/2916* (2013.01); *H04B 10/0777* (2013.01); *H04B 2210/074* (2013.01); *H04B 10/29* (2013.01); *H04J 14/0276* (2013.01)

(58) Field of Classification Search
CPC ... H04B 10/29; H04B 10/291; H04B 10/2916
USPC .................................................... 398/30–34
See application file for complete search history.

(56) References Cited

U.S. PATENT DOCUMENTS 5,870,213 A * 2/1999 Ishikawa et al. ................. 398/98
6,229,631 B1 * 5/2001 Sato et al. ......................... 398/30
(Continued)

FOREIGN PATENT DOCUMENTS

JP    2 119328    5/1990
JP    3 9626      1/1991
(Continued)

OTHER PUBLICATIONS

International Search Report Issued Oct. 26, 2010 in PCT/JP10/65128 Filed Sep. 3, 2010.
(Continued)

*Primary Examiner* — Dzung Tran
(74) *Attorney, Agent, or Firm* — Oblon, McClelland, Maier & Neustadt, L.L.P.

(57) ABSTRACT

An optical communication system includes an optical-signal transmission unit transmitting an existing optical signal and a low-rate-signal superimposition unit superimposing a low-rate signal on the existing optical signal by intensity modulation. It further includes: a low-rate-signal extraction unit that extracts the low-rate signal from the existing optical signal on which the low-rate signal is superimposed and converts the extracted low-rate signal into a low-rate electric signal; an add-on optical-signal transmission unit that transmits an add-on optical signal; a low-rate-signal superimposition unit that superimposes a low-rate signal on the add-on optical signal by the intensity modulation based on the low-rate electric signal; and a repeater that repeats the add-on optical signal on which the low-rate signal is superimposed, to a transmission destination.

10 Claims, 2 Drawing Sheets

(51) Int. Cl.
*H04B 10/29* (2013.01)
*H04B 10/291* (2013.01)

(56) References Cited

U.S. PATENT DOCUMENTS

| | | | |
|---|---|---|---|
| 2002/0039217 A1* | 4/2002 | Saunders et al. | 359/161 |
| 2002/0101635 A1* | 8/2002 | Taketomi | 359/124 |
| 2005/0179989 A1 | 8/2005 | Osaka | |
| 2009/0238563 A1* | 9/2009 | Fukashiro et al. | 398/30 |

FOREIGN PATENT DOCUMENTS

| | | |
|---|---|---|
| JP | 5 344072 | 12/1993 |
| JP | 10 41889 | 2/1998 |
| JP | 10 126341 | 5/1998 |
| JP | 2003 348020 | 12/2003 |
| JP | 2004 228761 | 8/2004 |

OTHER PUBLICATIONS

Office Action issued Jan. 5, 2015 in Chinese Patent Application No. 201080068880.6 (with English-language Translation).

* cited by examiner

OPTICAL COMMUNICATION SYSTEM

FIELD

The present invention relates to an optical communication system.

BACKGROUND

In a long-distance optical communication system such as a submarine cable system, a supervisory signal for supervision is often transmitted with being superimposed on an optical signal in order to supervise the status of an optical repeater. In such an optical communication system, the optical repeater amplifies and repeats a high-rate main signal in a state of light without the signal being regenerated, as described in Patent Literature 1 mentioned below, for example. On the other hand, the supervisory signal is a low-rate signal lower in bit rate than the main signal, and transmitted with being superimposed on intensity modulation of the optical signal. The repeater extracts and receives the superimposed low-rate signal, whereby the supervisory signal is transferred to the repeater.

For example, the submarine cable system has a design life as long as 20 years or more. The transmission capacity of the submarine cable system is often increased by additionally providing devices for transmitting and receiving optical signals having newly adopted wavelengths on land stations located on both ends of the submarine cable system according to the demand of communication lines.

Meanwhile, technological advancement enables expansion in optical signals to the extent that the capacity of the submarine cable system exceeds the maximum capacity designed at the beginning of the construction of submarine cables. Devices into which a new technology is introduced are additionally provided on the land stations, and an optical signal having an existing wavelength is multiplexed with an add-on optical signal transmitted from the add-on device, and the resultant signal is transmitted to the submarine cable, whereby it is possible to realize an expanded capacity that surpasses an initial limit.

For example, it is assumed that the existing submarine cable system includes an optical-signal transmission unit that transmits an optical signal, a transmitter that generates a low-rate supervisory electric signal, a low-rate-signal superimposition unit that superimposes the low-rate signal on an intensity of the optical signal to realize modulation, a repeater, a low-rate-signal reception unit that extracts the low-rate supervisory signal, an optical-signal reception unit that receives the existing optical signal, and a demultiplexer that demultiplexes an optical signal transmitted via the repeater and outputs optical signals obtained by the demultiplex to the low-rate-signal reception unit and the optical-signal reception unit, respectively. To this submarine cable system, an add-on optical-signal reception unit that receives a new add-on optical signal, a multiplexer that multiplexes the existing optical signal with the new add-on optical signal, an add-on demultiplexer that demultiplexes the optical signal transmitted via the repeater, an add-on optical-signal transmission unit that transmits the new add-on optical signal, and an add-on demultiplexer that demultiplexes the optical signal transmitted via the repeater and outputs optical signals obtained by the demultiplex to the demultiplexer and the add-on optical-signal reception unit are added.

The optical signals transmitted from the optical-signal transmission unit and the add-on optical-signal transmission unit are not necessarily optical signals having a single wavelength but are often multiplexed with a plurality of wavelengths. Furthermore, in general, a number of repeaters are provided as needed, and the optical signals reach the other end of the submarine cable via the repeaters. The existing devices and the add-on devices are provided on the other end of the submarine cable.

The existing optical signal is transmitted from the optical-signal transmission unit, the low-rate signal is superimposed on this optical signal by the low-rate-signal superimposition unit to transmit the resultant signal, and the add-on optical signal is multiplexed with the resultant signal by the multiplexer and the multiplexed optical signal reaches the repeater.

CITATION LIST

Patent Literature

Patent Literature 1: Japanese Patent Application Laid-open No. 2-119328

SUMMARY

Technical Problem

However, the conventional technique described above has the following problem. As the number of add-on optical signals increases, a modulation degree of the supervisory signal sent to the repeater decreases because the supervisory signal is not superimposed on the add-on optical signals. Accordingly, the repeater is unable to extract and receive the supervisory signal and it may be impossible to keep supervision by the repeater.

Furthermore, the conventional technique has another problem. If the existing optical signal is not transmitted but only the add-on optical signals are transmitted, no supervisory signal is superimposed.

The present invention has been made in view of the above-mentioned circumstances, and an object of the present invention is to provide an optical communication system that can keep supervision in a repeater without reducing a modulation degree of a low-rate supervisory signal even if an optical signal is additionally introduced.

Solution to Problem

In order to solve the problems and achieve the object, the present invention provides an optical communication system including a first optical-signal transmission unit that transmits a first optical signal and a first low-rate-signal superimposition unit that superimposes a low-rate signal on the first optical signal by intensity modulation, the optical communication system comprising: a low-rate-signal extraction unit that extracts the low-rate signal from the first optical signal on which the low-rate signal is superimposed, and converts the extracted low-rate signal into a low-rate electric signal; a second optical-signal transmission unit that transmits a second optical signal; a second low-rate-signal superimposition unit that superimposes a low-rate signal on the second optical signal by intensity modulation based on the low-rate electric signal; and a repeater that repeats the second optical signal on which the low-rate signal is superimposed, to a transmission destination.

Advantageous Effects of Invention

The optical communication system according to the present invention can keep supervision by the repeater without reducing the modulation degree of a low-rate supervisory signal even if an optical signal is additionally introduced.

DESCRIPTION OF EMBODIMENTS

An optical communication system of embodiments according to the present invention will be described below in detail with reference to the drawings. The present invention is not limited to the embodiments.

First Embodiment

Figure 1:
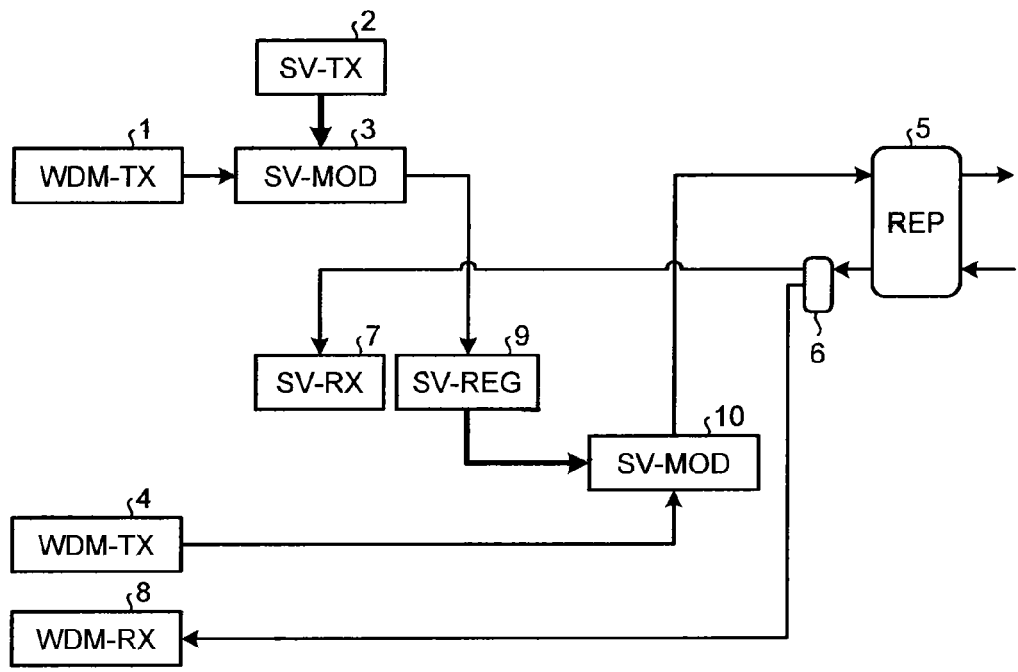
FIG. 1 is a diagram showing a configuration example of an optical communication system according to a first embodiment.

FIG. 1 is a diagram showing a configuration example of an optical communication system according to a first embodiment of the present invention. The optical communication system according to the present embodiment is an optical communication system in which devices for transmitting and receiving an add-on optical signal are added to an existing optical communication system.

For example, the optical communication system according to the present embodiment is applicable to an optical communication system that transmits optical signals using an optical submarine cable, but also applicable to an optical communication system a part or all of transmission sections of which are land sections.

The optical communication system according to the present embodiment includes, as the existing optical communication system, an optical-signal transmission unit (WDM-TX: a first optical-signal transmission unit) 1 transmitting an existing optical signal, a supervisory-signal transmission unit (SV-TX) 2 generating a low-rate supervisory electric signal, a low-rate-signal superimposition unit (SV-MOD: a first low-rate-signal superimposition unit) 3 superimposing the low-rate signal on the optical signal to make modulation by intensity-modulating the optical signal, a repeater (REP) 5, and a low-rate-signal reception unit (SV-RX) 7 extracting a low-rate supervisory signal.

In the optical communication system according to the present embodiment, an add-on optical-signal transmission unit (WDM-TX: a second optical-signal transmission unit) 4 transmitting a new add-on optical signal, a demultiplexer 6 demultiplexing an optical signal transmitted via the repeater 5, an add-on optical-signal reception unit (WDM-RX) 8 receiving the new add-on optical signal, a low-rate-signal extraction unit (SV-REG) 9 receiving the optical signal, extracting the low-rate supervisory signal, and converting the extracted low-rate supervisory signal into an electric signal, and a low-rate-signal superimposition unit (SV-MOD: a second low-rate-signal superimposition unit) 10 superimposing a low-rate signal on the optical signal transmitted from the add-on optical-signal transmission unit 4 based on the electric signal obtained by the conversion are added to the existing optical communication system.

In the optical communication system according to the present embodiment, the optical-signal transmission unit (WDM-TX) 1, the supervisory-signal transmission unit 2, the low-rate-signal superimposition unit 3, the add-on optical-signal transmission unit 4, the repeater 5, the demultiplexer 6, the low-rate-signal reception unit 7, the add-on optical-signal reception unit 8, the low-rate-signal extraction unit 9, and the low-rate-signal superimposition unit 10 shown in FIG. 1 are defined as one set for a transmission-reception system. Such transmission-reception systems are provided on ends of the optical communication systems connected to each other via the repeater 5, respectively. The necessary number of repeaters 5 are provided between the transmission-reception systems on the ends as needed. The repeater 5 compensates for a propagation loss of the received optical signal, repeats the optical signal, and receives the low-rate signal superimposed on the optical signal.

The optical signal transmitted from one of the transmission-reception systems is transmitted to the other transmission-reception system via the repeater 5 and received by the other transmission-reception system. In FIG. 1, thin solid arrows denote sections in which signals are transmitted in the form of optical signals, and thick solid arrows denote sections in which signals are transmitted in the form of electric signals.

Operations according to the present embodiment are explained next. In the present embodiment, the existing signal is transmitted from the optical-signal transmission unit 1, but not transmitted via the repeater 5, and any optical signal transmitted via the repeater 5 is supposed to be an added optical signal.

First, the existing optical signal is transmitted from the optical-signal transmission unit 1. The low-rate-signal superimposition unit 3 modulates the intensity of this existing optical signal based on the low-rate supervisory electrical signal, thereby superimposing the supervisory signal on the existing optical signal. Operations described above are equal to those of the conventional optical communication systems.

The low-rate-signal superimposition unit 3 outputs the optical signal on which a low-rate signal serving as the supervisory signal is superimposed, to the low-rate-signal extraction unit 9. The low-rate-signal extraction unit 9 extracts the low-rate signal out of the optical signal outputted from the low-rate-signal superimposition unit 3, and outputs the extracted low-rate signal to the low-rate-signal superimposition unit 10 as an electric signal. The low-rate-signal extraction unit 9 can be realized by, for example, a photodetector that converts an optical signal into an electric signal and a lowpass filter (low-frequency pass filter) or a bandpass filter (passband filter) that extract a desired low-rate signal from the electric signal.

The low-rate-signal superimposition unit 10 superimposes the low-rate signal extracted by the low-rate-signal extraction unit 9 on the added optical signal (hereinafter, referred to as "add-on optical signal") transmitted from the add-on optical-signal transmission unit 4, and outputs the resultant signal to the repeater 5. The low-rate-signal superimposition unit 10 can be configured by, for example, a Raman amplifier that amplifies the intensity of an optical signal by the use of the Raman effect within an optical fiber. It is known that the Raman amplifier can amplify the intensity of an optical signal according to the intensity of excitation light using light having a shorter wavelength by about 100 nm than that of the amplified optical signal, as its input of the excitation light. By modulating the intensity using the low-rate signal as the excitation light, the gain of the Raman amplifier changes and the low-rate signal can be superimposed on the intensity of the passing optical signal. In principle, the Raman amplifier has a high-speed response. Therefore, the Raman amplifier can sufficiently modulate the intensity of the low-rate signal when the frequency of the low-rate signal is several hundreds of kilohertz, for example.

Note that shortening the optical fiber of the Raman amplifier or causing the excitation light for the Raman amplifier to make to be incident thereupon in the same propagation direction as that of the optical signal can reduce propagation delays of the optical signal and the excitation light within the optical fiber within which the optical signal is amplified, thereby to make it possible to modulate the intensity at a higher rate. When a modulation rate of the low-rate signal is relatively low, for example, has its rate of several tens of kilohertz or less, an Erbium-doped fiber amplifier (EDFA) can be used to modulate the excitation light with the low-rate signal, thereby to make it possible to realize similar functions. Alternatively, an intensity modulator can be used to superimpose the low-rate signal on the optical signal.

The add-on optical signal transmitted from the low-rate-signal superimposition unit 10 reaches the transmission-reception system on the other end via the repeater 5 (or via a plurality of repeaters 5 provided as needed). The repeater 5 performs a predetermined supervision process using the supervisory signal superimposed on the add-on optical signal transmitted from the low-rate-signal superimposition unit 10. In the transmission-reception system on the other end, the demultiplexer 6 demultiplexes the add-on optical signal transmitted from the repeater 5, and outputs optical signals obtained by the demultiplex to the add-on optical-signal reception unit 8 and the low-rate-signal reception unit 7, respectively.

The add-on optical-signal reception unit 8 performs a predetermined receiving process on the received add-on optical signal. The low-rate-signal reception unit 7 extracts the supervisory signal that is the low-rate signal from the add-on optical signal, and performs a predetermined process on the supervisory signal.

As described above, according to the present embodiment, the low-rate-signal extraction unit 9 extracts the supervisory signal from the existing optical signal. The low-rate-signal superimposition unit 10 superimposes the supervisory signal extracted by the low-rate-signal extraction unit 9 on the add-on optical signal, and outputs the resultant signal to the repeater 5. Accordingly, even if transmission of the existing optical signal from the optical-signal transmission unit 1 is stopped and only the add-on optical signal is transmitted, the supervisory signal can be transmitted to the repeater 5. That is, even if the number of optical signals increases, it is possible to keep supervision by the repeater without the modulation degree of the low-rate supervisory signal being made degraded.

The use of the optical signal having high frequency usage efficiency and high modulation rate as the add-on optical can increase an overall transmission capacity of the optical communication system, as compared with a case of transmitting the existing optical signal. Moreover, the existing devices can be continuously used for the transmission device and the reception device for the low-rate supervisory signal (the low-rate-signal superimposition unit 3 and the low-rate-signal reception unit 7). Accordingly, the add-on optical-signal reception unit does not need to include transmission and reception functions in an old form, and options for which devices can be introduced as the add-on light reception unit range widely.

Second Embodiment

Figure 2:
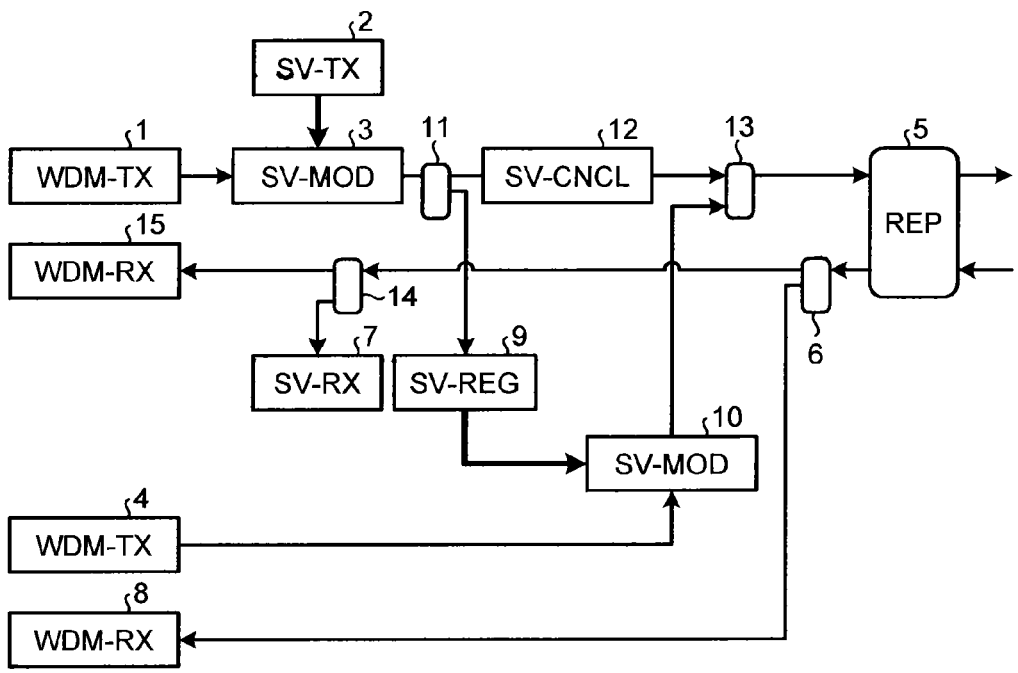
FIG. 2 is a diagram showing a configuration example of an optical communication system according to a second embodiment.

FIG. 2 is a diagram showing a configuration example of an optical communication system according to a second embodiment of the present invention. As shown in FIG. 2, a transmission-reception system that constitutes the optical communication system according to the present embodiment is equal to the transmission-reception system that constitutes the optical communication system according to the first embodiment except that a demultiplexer 11, a canceller unit (SV-CNCL: a first canceller unit) 12, a multiplexer 13, a demultiplexer 14 and an optical-signal reception unit (WDM-RX) 15 are added to the transmission-reception system that constitutes the optical communication system according to the first embodiment. Constituting elements having like functions as those in the first embodiment are denoted by reference symbols identical with those in the first embodiment, and redundant explanations thereof will be omitted.

Operations in the present embodiment are explained next. The demultiplexer 11 demultiplexes the existing optical signal on which the supervisory signal is superimposed, and inputs one of optical signals obtained by the demultiplex to the low-rate-signal extraction unit 9 and the other optical signal to the canceller unit 12.

The canceller unit 12 performs a process for cancelling the low-rate signal superimposed on the existing optical signal by controlling the intensity of the existing optical signal in order to avoid interference between the low-rate signal superimposed on the existing optical signal and the low-rate signal superimposed on the new optical signal. It is only necessary to dispose the canceller unit 12 as needed. For example, in a case where the interference that occurs between the low-rate signal superimposed on the existing optical signal and the low-rate signal superimposed on the new optical signal is ignorable of the like case, the canceller unit 12 is not required.

For example, the canceller unit 12 can be realized by a Raman amplifier having a gain modulated to cancel the superimposed low-rate signal. For example, the canceller unit 12 generates a cancelling signal obtained by inverting the low-rate signal, and performs intensity modulation using the Raman amplifier based on the cancelling signal. Alternatively, the Raman amplifier may be used to cancel the low-rate signal by controlling the Raman amplifier to keep its output power constant. When the modulation rate of the low-rate signal is relatively low, for example, has a value of several tens of kilohertz or less, an Erbium-doped optical fiber amplifier can be used to cancel the low-rate signal by controlling the Erbium-doped optical fiber amplifier to keep its output power constant.

The multiplexer 13 multiplexes the existing optical signal from which the canceller unit 12 cancels the low-rate supervisory signal with the add-on optical signal on which the supervisory signal transmitted from the low-rate-signal superimposition unit 10 is superimposed, and outputs the resultant optical signal to the repeater 5.

Furthermore, the demultiplexer 6 demultiplexes the optical signal that is transmitted from the transmission-reception system on the other end and outputted from the repeater 5. One of optical signals obtained by the demultiplex is inputted to the add-on optical-signal reception unit 8 whereas the other optical signal is inputted to the demultiplexer 14. The demultiplexer 14 demultiplexes the inputted optical signal, inputs one of optical signals obtained by the demultiplex to the low-rate-signal reception unit 7, and inputs the other optical signal to the optical-signal reception unit 15. As the optical-signal reception unit 15, an optical-signal reception unit included in the existing optical communication system is available. Operations according to the present embodiment other than those described above are the same as those in the first embodiment.

As described above, according to the present embodiment, the canceller unit 12 cancels the low-rate signal in the existing optical signal, and the multiplexer 13 multiplexes an existing optical signal obtained by the cancelling with the add-on optical signal which is transmitted from the low-rate-signal superimposition unit 10 and on which the supervisory signal is superimposed, and outputs the resultant optical signal to the repeater 5. Furthermore, the demultiplexer 14 demultiplexes the optical signal inputted and transmitted from the repeater 5, inputs one of the optical signals obtained by the demultiplex to the low-rate-signal reception unit 7, and inputs the other optical signal to the optical-signal reception unit 15. Accordingly, it is possible to achieve identical effects to those of the first embodiment and realize multiplex transmission in a state where the existing optical signal and the add-on optical signal are allowed to coexist.

Third Embodiment

Figure 3:
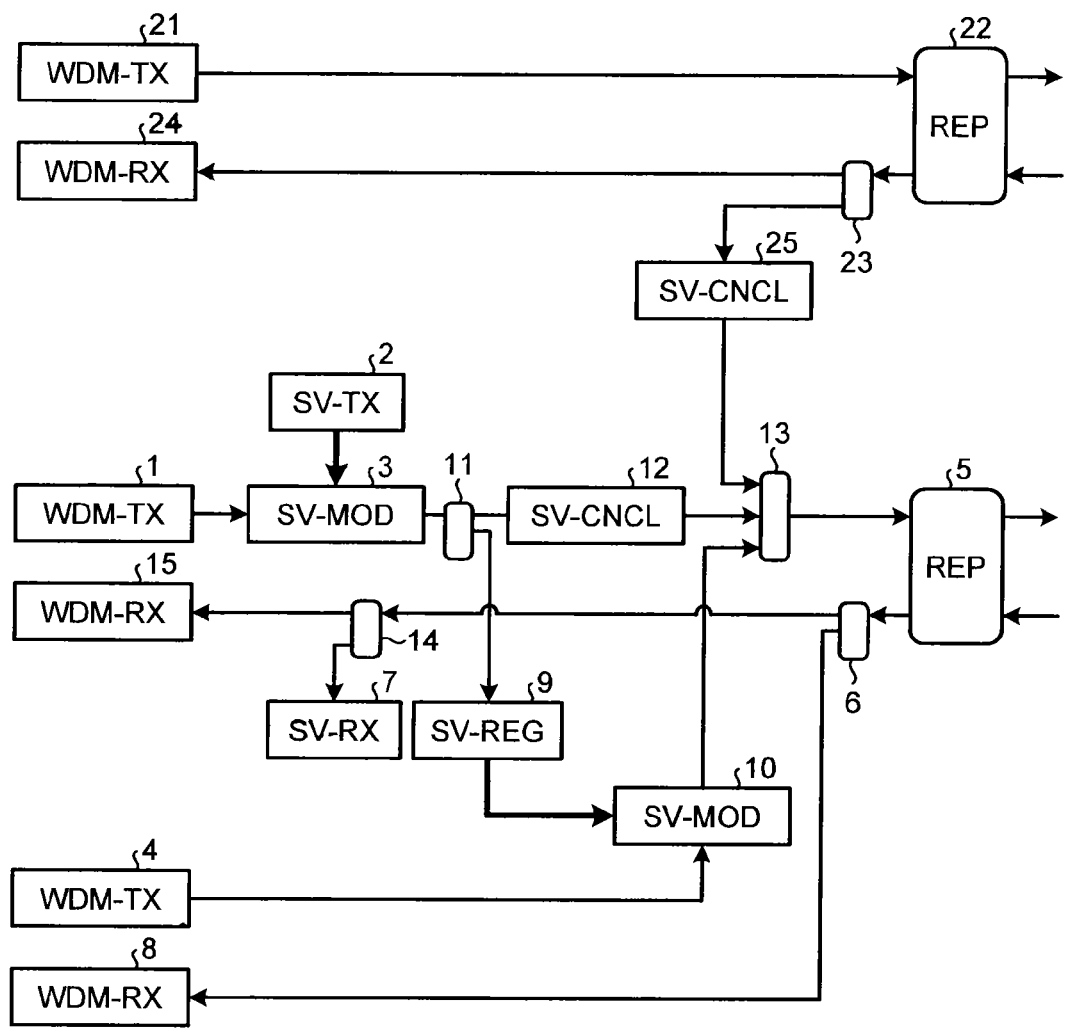
FIG. 3 is a diagram showing a configuration example of an optical communication system according to a third embodiment.

FIG. 3 is a diagram showing a configuration example of an optical communication system according to a third embodiment of the present invention. As shown in FIG. 3, the optical communication system according to the present embodiment is equal to that according to the second embodiment except that an optical-signal transmission unit (WDM-TX) 21, a repeater (REP) 22, a demultiplexer 23, an optical-signal reception unit (WDM-RX) 24, and a canceller unit (SV-CNCL: a second canceller unit) 25 are added to the optical communication system according to the second embodiment. Constituting elements having like functions as those in the second embodiment are denoted by like reference symbols and redundant explanations thereof will be omitted.

The optical-signal transmission unit 21, the repeater 22, the demultiplexer 23, the optical-signal reception unit 24, and the canceller 25 constitute a transmission-reception system (hereinafter, "second transmission-reception system") adjacent to the transmission-reception system described in the second embodiment (hereinafter, "first transmission-reception system"). The second transmission-reception system transmits an optical signal via the repeater 22 on a different route from that of the first transmission-reception system. In the present embodiment, the first transmission-reception system multiplexes the existing optical signal with the add-on optical signal and transmits the resultant optical signal similarly to the second embodiment. Not only this, the first transmission-reception system also subjects an optical signal repeated by the repeater 22 belonging to the second transmission-reception system to the multiplex and transmits a resultant optical signal.

The optical-signal transmission unit 21 sends out an optical signal and transmits the optical signal to the second transmission-reception system on the other end via the repeater 22 (or a plurality of repeaters 22 as needed). The demultiplexer 23 demultiplexes an optical signal that is transmitted from the second transmission-reception system on the other end and outputted from the repeater 22, and outputs one of optical signals obtained by the demultiplex to the optical-signal reception unit 24 and the other optical signal to the canceller unit 25.

The canceller unit 25 cancels a low-rate signal from the input optical signal similarly to the canceller unit 12, and inputs the optical signal from which the low-rate signal has been cancelled to the multiplexer 13. The multiplexer 13 multiplexes the existing optical signal inputted from the canceller unit 12, the add-on optical signal inputted from the low-rate-signal superimposition unit 10 and the optical signal inputted from the canceller unit 25, and inputs a resultant optical signal obtained by the multiplex to the repeater 5. The canceller unit 25 can be implemented in a similar configuration to that of the canceller unit 12 described in the second embodiment.

As described above, with the configuration in which a part of an optical signal repeated on a certain route is transmitted to a different route, a low-rate supervisory signal may be superimposed on the optical signal repeated by the repeater 22. In that case, if the multiplexer 13 subjects the optical signal received from the repeater 22 to the multiplex as is, then two types of low-rate supervisory signals are mixed up and superimposed, resulting in interference or the like. According to the present embodiment, the canceller unit 25 cancels the low-rate supervisory signal in the optical signal repeated by the repeater 22. Therefore, the multiplexer 13 can transmit only the low-rate signal superimposed by the low-rate-signal superimposition unit 10 to the repeater 5. There is no need to provide the canceller unit 25 when the low-rate supervisory signal is not superimposed on the optical signal repeated by the repeater 22.

As described above, according to the present embodiment, in a case where the multiplexer 13 multiplexes the existing optical signal from which the low-rate signal has been cancelled and the add-on optical signal on which the low-rate signal has been superimposed and the optical signal having been repeated on the different route and transmits the resultant optical signal, the canceller unit 25 cancels the low-rate signal superimposed on the optical signal and inputs the optical signal obtained by the cancellation to the multiplexer 13. Accordingly, the present embodiment can achieve identical effects to those of the second embodiment, and it is possible to avoid mixing two types of supervisory signals even when the low-rate signal is superimposed on the optical signal repeated on the different route.

INDUSTRIAL APPLICABILITY

As described above, the optical communication system according to the present invention is useful for an optical communication system that transmits a low-rate signal for supervision with the signal being superimposed on an optical signal, and particularly suitable for submarine cable systems.

REFERENCE SIGNS LIST 1, 21 optical-signal transmission unit (WDM-TX)
2 supervisory-signal transmission unit (SV-TX)
3, 10 low-rate-signal superimposition unit (SV-MOD)
4 add-on optical-signal transmission unit (WDM-TX)
5, 22 repeater (REP)
6, 11, 14, 23 demultiplexer
7 low-rate-signal reception unit (SV-RX)
8 add-on optical-signal reception unit (WDM-RX)
9 low-rate-signal extraction unit (SV-REG)
12, 25 canceller unit (SV-CNCL)
13 multiplexer
15, 24 optical-signal reception unit (WDM-RX)

The invention claimed is:
1. An optical communication system, comprising:
a first optical-signal transmission unit that transmits a first optical signal;
a first low-rate-signal superimposition unit that superimposes a low-rate signal on the first optical signal by intensity modulation;
a low-rate-signal extraction unit that extracts the low-rate signal from the first optical signal on which the low-rate signal is superimposed, and converts the extracted low-rate signal into a low-rate electric signal;

a second optical-signal transmission unit that transmits a second optical signal;

a second low-rate-signal superimposition unit that superimposes a low-rate signal on the second optical signal by intensity modulation based on the low-rate electric signal; and a repeater that repeats the second optical signal on which the low-rate signal is superimposed, to a transmission destination.

2. The optical communication system according to claim 1, further comprising a multiplexer that generates a multiplex signal obtained by multiplexing the first optical signal on which the low-rate signal is superimposed and the second optical signal on which the low-rate signal is superimposed, wherein
the repeater repeats the multiplex signal to the transmission destination.

3. The optical communication system according to claim 2, further comprising a canceller unit that controls an intensity of the first optical signal to cancel the low-rate signal from the first optical signal on which the low-rate signal is superimposed, wherein
the multiplexer multiplexes the first optical signal from which the low-rate signal is cancelled by the canceller unit and the second optical signal on which the low-rate signal is superimposed, to generate the multiplex signal.

4. The optical communication system according to claim 3, wherein
the canceller unit includes a Raman amplifier, and
the canceller unit modulates the intensity of the first optical signal on which the low-rate signal is superimposed by changing a gain of the Raman amplifier based on a cancelling signal obtained by inverting the low-rate signal superimposed on the first optical signal.

5. The optical communication system according to claim 3, wherein the canceller unit includes a Raman amplifier controlled to keep an output power of the Raman amplifier constant.

6. The optical communication system according to claim 3, wherein the multiplexer is, to generate the multiplex signal, adapted further to multiplex a third optical signal repeated by a repeater other than the repeater with the first and second optical signals,
the canceller unit is a first canceller unit,
the optical communication system further comprises a second canceller unit that controls an intensity of the third optical signal to cancel a low-rate signal superimposed on the intensity of the third optical signal, and
the multiplexer multiplexes, for the third optical signal repeated by the other repeater, the third optical signal from which the low-rate signal is cancelled by the second canceller unit with the first and second optical signals.

7. The optical communication system according to claim 2, wherein the multiplexer is, to generate the multiplex signal, adapted further to multiplex a third optical signal repeated by a repeater other than the repeater with the first and second optical signals.

8. The optical communication system according to claim 1, wherein
the low-rate-signal extraction unit includes
a photodetector that converts an input optical signal into an electric signal, and
a lowpass filter or bandpass filter that extracts the low-rate electric signal from the electric signal.

9. The optical communication system according to claim 1, wherein
the second low-rate-signal superimposition unit includes a Raman amplifier, and
the second low-rate-signal superimposition unit modulates an intensity of the second optical signal by changing a gain of the Raman amplifier according to the low-rate electric signal.

10. The optical communication system according to claim 1, wherein the repeater performs a supervision process by using the low-rate signal superimposed on the second optical signal.

* * * * *